2,974,039
MOLDING OF METAL POWDERS

Max Deventer, 672 Dag-Gelande, Allendorf, Kreis Marburg, Germany, and Richard Felix Paul Wagner, deceased, late of Velburg, Germany; Elisabeth Steichele, heir of Richard Felix Paul Wagner, deceased No Drawing. Filed Feb. 7, 1956, Ser. No. 598,223
(Filed under Rule 47(a) and 35 U.S.C. 116)
Claims priority, application Germany Feb. 5, 1951

2 Claims. (Cl. 75—201)

This invention concerns improvements in and relating to the molding of metal powders and it relates more particularly to graphite-containing molded articles for use as self-lubricating oil-less bearings, piston rings, packing rings and the like and to methods of making such articles.

This is a continuation-in-part of application Serial No. 266,110, filed January 11, 1952, now abandoned and application Serial No. 447,850, filed August 4, 1954, now abandoned.

It has been proposed heretofore to mold metal powder into metallic articles under heat and pressure to produce solid articles or porous metal articles which may be suitably impregnated with oil, for example, to form self-lubricating bearings. Moreover, attempts have been made in the past to produce self-lubricating oil-less bearings by using graphite in bearings and bearing metals instead of oil. The prior efforts in the manufacture of self-lubricating bearing metals in which lubrication is afforded by a solid lubricant have not been successful because a sufficiently strong metal to serve as a bearing or the like could not be produced in which enough graphite was present and was sufficiently uniformly distributed to provide a continuous lubricating film on the operating surface of a bearing.

The prior efforts failed largely because others did not understand or recognize the conditions needed to distribute or mix a large amount of graphite uniformly with powdered metal and the technique of molding the mixture to produce a strong material. The metal powders used heretofore were relatively coarse and made up of particles of generally spherical or regularly crystalline shape. Such powders have a high apparent density, that is, a weight exceeding about 2.5 grams per cubic centimeter. Such an apparent density is much greater than the apparent weight or density of finely divided graphite. The great difference in the weight of the metal powder and graphite caused them to stratify even when attempts were made to mix them thoroughly. Accordingly, when the mixture of metal powder and graphite was formed into molded articles, the graphite stratified and clumped so that the molded article had low and unpredictable mechanical strength and did not have and could not maintain a uniform lubricating film of graphite thereon. Moreover, some of the prior methods involved the heating of the metals to their melting points. When melting occurs, the particles tend to coalesce causing the graphite particles to agglomerate and form large irregularly distributed clumps. Efforts were made to prevent agglomeration of the graphite under such circumstances by maintaining the mixture under pressure during heating and/or cooling but were not successful.

Others have proposed the use of coarse iron powders with relatively coarse graphite and heating a compact of such materials at relatively low temperatures, i.e., 700° to 800° C. and using high molding pressures, i.e., 42 to 71 tons per square inch. These latter methods were not satisfactory because the resulting product is too weak mechanically to serve as a self-lubricating material when it contains sufficient graphite to afford any lubrication.

It is an object of this invention to provide a metal powder molding or molded article having a firmly adhering graphite film on its surface and having graphite distributed uniformly throughout it. A further object is to provide a simple, economic and effective process for preparing such a molded article.

It has now been found that self-lubricating graphite-containing metal articles of a kind suitable for use in bearings, piston rings, packing rings and many other articles, where reduction of friction between moving parts is required, can be manufactured from mixtures of finely divided graphite and metal powders of certain physical characteristics. The powdered metals used in the present invention have similar characteristics and at least those which are not melted in subsequent processing differ in shape from the more or less spherical particles which are produced by spraying molten metal in air. Sharp-edged, crystalline, fibrous lamina or leaf-shaped metal should be used, the metal particles either being irregularly shaped when produced or assuming such shape through agglomeration of smaller particles. Powdered metals of the kind utilized as the major component of a molding powder consist of irregularly-shaped (including dendritic or leaf-shaped) particles of metal of a size such that substantially all of the particles will pass through a 325 mesh screen and the heavier metals, by reason of their size and shape, have an apparent density not exceeding 20% of the density of the corresponding solid metal. For example, electrolytically or chemically precipitated copper powders of 325 mesh size that are suitable for use in the present method have an apparent density of 0.7 to 1.7 grams per cubic centimeter. Lighter metals, such as aluminum powders having the above-described characteristics may have an apparent density exceeding 20% of their true density but their density should not exceed 1.7 grams per cubic centimeter. Such metal powders consist predominantly of metal particles having a size less than 30 microns in maximum dimension and a minor proportion (up to 25%) of larger particles up to 60 microns in size. The particles range in size down to 5 microns and even smaller.

More particularly, microscopic examination of these powdered metals shows that they contain about 0% to 25% of particles having a size between about 30 and 60 microns, and 5% to 80% having a size less than 30 microns, and including about 1% to 18% of particles less than 5 microns in maximum dimension. In some instances, however, the major proportion of particles in a suitable molding powder may be smaller than 5 microns and the average size of the particles may be between 5 and 10 microns.

Metal powders of the class indicated are mixed with between about 4% and 17% of a finely divided graphite of a type known in Germany as colloidal graphite and available commercially there and having most of its particles about 1 micron or smaller in maximum dimension. Such graphites normally contain larger particles formed by clumping or agglomeration of the smaller particles so that when examined under a microscope, larger particles than 1 micron appear to be present in the graphite powder. Graphites of this type have an apparent density of about 0.35 to .7 gram per cubic centimeter which is not greatly different from the apparent density of the metal powders used in the present process. Other finely divided graphites having an apparent density not substantially exceeding 0.7 gram per cubic centimeter are available in the United States and may be used in the new material.

The low apparent densities of the metal powders and graphite and the similarity of their apparent densities enables them to be mixed thoroughly and homogeneously. Stratification and separation of the graphite is avoided so that it is uniformly distributed throughout the finished metal product and does not separate or agglomerate during subsequent processing as described hereinafter.

A typical metal powder material or mixture for admixture with graphite may comprise an iron powder of the character described above in admixture with up to 50% by weight of copper powder, copper alloy powder or nickel powder and in some instances another non-ferrous metal powder, such as tin, zinc, antimony, lead, cobalt, titanium and the like, and their alloys. An iron and copper-containing mixture may contain a hardening agent such as beryllium in an amount between about 0.1% and 2% by weight. Other materials suitable for bearings and the like may comprise copper and tin alloys, i.e., bronzes; copper, nickel and chromium alloys and chromium-cobalt and iron alloys for high temperature operation.

The mixture of metal powders contains as a principal component (50% or more) iron, copper, titanium, nickel, aluminum or other metal powder of the above-described apparent density selected to provide the properties required in the ultimate product. In the case of iron-base products, a proportion of copper or nickel must be present in order to enable sufficient graphite to be included in the resulting bearing material to render it self-lubricating and to prevent excessive weakening of the product by the presence of graphite therein. Other alloying metals may be present in an amount up to 50%. In copper-iron alloys, iron is the principal component and is present in an amount between about 50% and 60% of the total weight of the molding mixture while the copper may vary between about 30% and 40%. In bronze metals, copper is the predominating metal and is present in an amount between about 70% and 76%. Tin for alloying with copper is present in an amount between about 10% and 14% and the molding powder may contain lead up to about 3½%.

For stainless steel alloys of the 18 and 8 type, iron may be present in about the usual proportion of 66% in a material containing about 8% graphite.

For high nickel alloys, such as "Inconel" and "Monel," nickel is the principal component and may vary between about 63% and 86% of the finished material.

Aluminum alloys may contain 95% or more powdered aluminum.

In general, the alloying components, exclusive of graphite will, therefore not usually exceed 40% or be less than 4% of the total weight of the material.

It is expedient first to dry the mixture of metal powder and graphite at about 100° to 200° C. prior to cold compressing it. Such powdered metal can be readily and uniformly mixed with the graphite because of the similarity in their apparent densities and the mixture is rough-pressed into a body or article having a sufficiently high green strength to enable it to be handled without cracking or shattering in subsequent operations. The pressure required for rough-pressing the mixture is sufficient to give the article substantial "green" strength and ordinarily will be between about 1000 atmospheres absolute (7.1 tons per square inch) and 3500 atmospheres (24.9 tons per square inch). The pressing operation produces a substantial increase in the density of the articles and locks the graphite in the pores of the compressed metal powder for further treatment. Such further treatment comprises exposing the article to an elevated temperature which is substantially below the melting point of the major component or components of the metal powder but it may be above the eutectic point of any alloy formed therefrom and above the melting point of the low melting, minor components, such as tin and lead. The temperature must be high enough to enable the particles of metal to be bonded together, and it must be less than the temperature at which substantial solution of carbon or formation of carbides occurs. While the molded article is in a heated condition, it is subjected to a pressure of over 1000 atmospheres absolute (7.1 tons per square inch) and usually about two-thirds as high as the cold pressing pressure to compact the article and reduce any voids that might be present or might develop because of diffusion of the low-melting components into the higher melting components. Higher pressures may be used for pressing the heated article but such pressures are not beneficial and are economically disadvantageous especially when the article is of relatively large cross-section. Pressures on the order of 50 tons per square inch ordinarily should not be exceeded. The molded article is then cooled while maintaining it under pressure, to stabilize or fix the matrix.

The heating and pressing operation for convenience is referred to herein as a fritting operation. Its action is similar to a forge welding because it unites the heated particles at their points of contact by heat and pressure. It is conducted at such a relatively low temperature that melting of the principal component is avoided although it is high enough to render the larger particles capable of being united by high pressure and it may be high enough to melt and diffuse a lower melting, minor component or components, such as tin or lead, into the principal component. The irregular shape of the particles of the principal component makes the points of contact more numerous and of larger area than is the case with spherical particles so that they are united to form a matrix having greater mechanical strength and a more uniformly distributed but irregularly shaped pore structure in which the graphite is received than is obtainable with the spherical type powders. As a result, the graphite particles are distributed uniformly throughout the metal matrix and are trapped in the irregular pores where they are bound under high pressure during cooling of the compact under pressure. Accordingly, when wear occurs on the surface of a bearing produced from these bearing materials, graphite is released and exuded from the pores that are opened by such wear and a permanent film of graphite is maintained on the bearing surface.

The temperature to which the articles are heated depends on the kind of metal powder being molded and is determined largely by the melting point of the principal component of the mixture of molding powders. Thus, with mixtures containing iron and copper powders as the principal components, the fritting temperature will be in the vicinity of 930° to 960° C. and not higher than 1000° C. For fritting compacts to form bronze-containing material, i.e., copper-tin alloys, the fritting temperature may be approximately 720° to 775° C. For alloys of copper and zinc, the fritting temperature is on the order of 775° C. to 800° C. Mixtures of higher melting point powders, including nickel and chromium to form stainless steels, "Inconels" and "Monels," may be subjected to temperatures as high as 1200° C. but such temperature should not be substantially exceeded.

Further in accordance with the invention, the drying of the metal powder and/or the fritting together of the metal particles is effected in an inert or reducing atmosphere or with the exclusion of air, if the powders are subject to oxidation at the higher temperature.

The molded materials produced in accordance with the present invention are characterized by relatively great strength and a density approaching the theoretical true density of the mixture of metal and graphite. Most of the products have densities exceeding 90% of the theoretical density and many of them have densities above 95% of the theoretical density. The fine particles of graphite permeate the metal structure uniformly and inasmuch as the graphite is bound in the metal matrix during cooling of the metal under pressure, it is maintained under pressure so that the graphite can expand onto the surface of the material and forms a lasting graphite film which provides excellent lubrication. The extremely small particle size of graphite enables it to emerge through the fine pores in the metal matrix so that a thin, clean lubricating film is maintained on the exposed surface of the metal. The extremely fine pore size of the matrix results from the proper selection of metal particle size and graphite size. Inasmuch as innumerable very fine clumps of graphite are continuously exposed during the course of wear of the composition, the lubricating film is constantly replenished.

The new self-lubricating composition is readily machinable so that it can be made easily into bearings, packings, and other parts normally subjected to friction in use. These parts afford completely satisfactory lubrication, without being supplied with oil or other lubricant even at elevated temperatures, for example, such as are encountered in steam engines. At the same time, such bearings, packings and the like have relatively high tensile strength and hardness so that they can be employed under difficult operating conditions even at the high pressures and temperatures mentioned.

Practical testing extending over a long period of time has shown that the graphite film formed on the bearing surfaces of machine parts overcomes unevenness, for example, on piston rods or bearing surfaces of a cylinder or the like so that friction is reduced to a minimum and is in most cases practically completely eliminated.

The advantages attained with the new bearing metal do not reside solely in a saving of oil. It is of far greater importance that the new molded articles can be used in places that bearings requiring oil for lubrication are not very satisfactory. Inasmuch as oil freezes and loses its lubricating capacity at temperatures below the solidifying point and may break down at temperatures above 200° to 300° C., bearings requiring oil must be used within this temperature range. With the new graphite lubricated bearings, it is possible to exceed this temperature range and obtain adequate anti-friction properties under conditions where oil lubrication fails.

By suitable combination of the various metal powders, it is possible to adjust not only the mechanical properties of the moldings, but also their chemical properties so that they may be suitable for any purpose, may be made corrosion-resistant, and capable of use at pressures above 200 atmospheres absolute (2900 pounds per square inch).

It has been shown experimentally that there is a practically immeasurable abrasion of the machine parts in proper use once the graphite film has been formed. Even after several years' use, corrosion of the rods or of the bearing surfaces of, for example, pistons could not be detected, so that grinding or turning of these running parts, such as was hitherto necessary, becomes superfluous. Piston rings, packing rings, control parts and bearings can be employed without oil lubrication. With steam engines, turbines and the like, there is the advantage that an oil-free exhaust steam is obtained, so that the separation of oil from the steam or condensation product becomes unnecessary.

The moldings may be manufactured from iron powder. Equally, however, a non-ferrous metal powder may be used, and this powder may, in given cases, be mixed with iron powder.

The invention will be more clearly understood by reference to the following examples which are purely illustrative.

EXAMPLE 1

For manufacturing piston rings, iron powder is used which is freed from the larger particles by sieving or sifting, so that the powder contains at least 80 parts by weight of a particle size of less than 6 microns. The remainder can consist of particles of more than 30 microns. The iron powder is dried in a drum at 100° to 200° with the exclusion of air or with the passage of a reducing gas, and then mixed with copper powder, beryllium powder and with colloidal graphite in the following ratio:

54 parts by weight of iron,
39 parts by weight of copper,
6 parts by weight of colloidal graphite,
1 part by weight of beryllium When mixing, care must be taken to ensure that a homogeneous mixture is obtained which is then filled into a mold and rough-pressed under a pressure of about 1,000 atmospheres absolute (7.1 tons per square inch). The molding can be taken from this mold and introduced into another mold or can be further treated in the same mold. The molded article is now introduced into an annealing furnace or heated by a high frequency current and at the same time exposed to a pressure of over 1,000 atmospheres absolute, preferably of not under 1,500 atmospheres absolute, one of 3,000 atmospheres absolute (21.3 tons per square inch) being expedient. The temperature here is kept at 960° C. and the pressure-heat treatment is so controlled that the particles of metal powder are fritted together without great loss in volume and the particles are cemented or stuck together only at their points of contact.

The mold is now cooled, the pressure being maintained until the structure has crystallized, which occurs at about 150° to 300° C. The pressure is then released and the molding is removed from the mold.

Iron alloy metals of the type described above containing 4% to 6% graphite are particularly useful for parts which are subjected to severe mechanical stresses in use, such as, for example, piston rings, piston slides, and the like, which must withstand high operating temperatures. Such iron alloy metals are not, however, satisfactory for self-lubricating bearings because the proportion of graphite therein is too low. A satisfactory self-lubricating bearing useable at substantial operating speeds (surface speeds) must contain at least 8% graphite to prevent rapid wear of the bearing and possible scoring of the opposing element. 8% or more graphite can be included readily in iron-copper mixtures of the kind disclosed in Example 1 without such loss of strength and resiliency of the finished metal as to preclude its use as a bearing material. The irregular shape of the particles and the copper enables the graphite content to be present in sufficient amount to render the material self-lubricating without so seriously weakening the material as to render it completely unusable as a self-lubricating bearing metal. The presence of a substantial proportion of copper appears to aid in forge welding or cementing the irregular particles together and thus imparts strength to the metal sufficient to compensate for the weakening produced by the inclusion of 4% or more of graphite.

The new material can be made in the form of bronzes for use in many fields where bronze or antifriction bearings have been used heretofore. The conditions for the manufacture of such bronze bearings are similar to those described above taking into account, of course, the differences in properties of iron and copper.

By way of example, a high quality oil-less, self-lubricating bearing can be produced in the following manner:

EXAMPLE 2

A commercially available copper powder produced by chemical precipitation and having an apparent density of 1.2 grams per cubic centimeter is used as the principal component of the bearing material. This copper powder is of a particle size such that 100% passes through a 325 mesh screen, the largest particles therein being about 44 microns in their maximum dimension and the major portion of the powder (about 75%) being less than 30 microns in maximum dimension. The particles are irregularly shaped and of a so-called dendritic formation being largely free of spherical or rounded shapes. 76% by weight of the copper powder is mixed with 12.5% tin, 3.5% lead and 8% graphite, the last of a kind having an apparent density of about .6 gram per cubic centimeter. This so-called "colloidal" graphite has the characteristics described above, being principally of a particle size of 1 micron or less but containing clumps or agglomerates which may be as large as 30 microns in diameter. Due to the low apparent density of the copper, it can be thoroughly mixed with the other powdered metals and the graphite to provide a uniform mixture. The particle sizes and shapes of the tin and lead powders are relatively unimportant although for good mixing, they should be predominantly less than 75 microns in maximum dimension so that their apparent densities are not so high as to preclude fairly uniform distribution throughout the molding mixture. These components of the mix will melt in any event and will diffuse into the copper under the heat treatment described hereinafter so that their particle size is not as critical as the particle size of the copper and the graphite.

The mixture of the powdered components is compressed at room temperature in a mold at a pressure of about 21 tons per square inch to produce an article which has sufficiently high green strength to enable it to be handled roughly or even dropped, without danger of breaking or shattering. The cold compacted article is ejected from the press mold and is placed in a furnace where it is heated to a temperature of 720° C. After the article is heated for one hour, it is removed and placed in a mold which has been heated previously to between about 200° C. and 300° C. The article is again pressed at a pressure of about 14 tons per square inch. The pressure is kept on the article in the mold until it is cooled below the temperature of crystallization of the metal, after which the article is ejected from the mold. Ordinarily, the article is cooled to between 150° C. and 300° C. before ejection from the mold and inasmuch as the mold is heated, it can be immediately reused for molding other articles. The use of a hot mold avoids surface chilling and hardening of the heated articles and prevents the article from sticking to the mold. Hot molds also produce a much more uniform compression of the molded article and avoid breakage of the molds and damage to the molded articles.

The product resulting from this treatment had the physical characteristics shown in column I of the following table:

*Table I*

|  | I | II | III |
| --- | --- | --- | --- |
| Density g./cc | 6.81 | 6.66 | 6.34 |
| Percent of theoretical | 96.7 | 99.0 | 98.5 |
| Transverse rupture, p.s.i.: |  |  |  |
| Parallel to pressing | 34,800 | 33,800 | 33,500 |
| Perpendicular to pressing | 34,200 | 32,200 | 32,700 |
| Radial crushing strength, p.s.i. | 23,100 | 18,300 | 14,700 |
| Compressive strength, p.s.i. | 38,200 | 39,000 | 31,400 |
| Hardness, Rockwell | H-87 | H-93 | H-93 |
| Tensile strength, p.s.i. | 11,600 | 11,200 | 10,800 |
| Elongation, percent in ½" | 2.0 | 2.0 | 2.0 |

Densities and compression strengths were determined on cylinders one inch long and having three-quarter inch diameters.

Transverse rupture strength was determined on specimens three-sixteenths inch by three-sixteenths inch square using a constant loading beam device.

Radial crushing strength was measured on tubes one inch long having an inside diameter of one-half inch and an outside diameter of three-quarters of an inch.

Tensile strength was measured on standard one-eighth inch specimens.

The materials having the physical characteristics set forth in columns II and III differ from the material of Example in that they contain 10% graphite and 12% They were made as described in Example 2. Other satisfactory graphite-lubricated bronzes can be prepared from similar mixtures of metal powders containing between about 10% and 14% tin.

The above-described copper-containing (bronze) bearing metals are interesting in that they contain relatively high percentages of lead which does not sweat out and is not lost during the fritting operation. The presence of lead, however, may somewhat weaken the bearing metal and it may be omitted as shown in the following example:

EXAMPLE 3

74.5% copper powder having an apparent density of 1.2 grams per cubic centimeter is intimately mixed with 12½% tin and 12% carbon as graphite. This mixture is cold pressed at 21 tons per square inch, then fritted by heating it for one hour at 720° C., and hot-pressing at 14 tons per square inch in the manner described above. This bearing metal was somewhat lighter in weight but of increased strength as compared with the bronze metals described above.

Variations in the amount of graphite are possible, of course, depending upon requirements and a similar alloy can be made containing, for example, 10% graphite and 77.5% copper. Likewise, even higher graphite percentage may be used. However, it has been found that if the percentage of graphite in the mixture exceeds 17%, the resulting product is seriously weakened and is not a satisfactory bearing material.

While the iron and copper bearing metals satisfy most requirements, it has been found in some instances that for extremely high temperature operations, it may be desirable to form the bearing material of heat-resistant metal alloys, such as, iron, chrome and nickel alloys.

EXAMPLE 4

A typical alloy for high temperature use and high corrosion resistance may consist of 66% iron powder, 8% nickel powder, 18% chromium powder and 8% graphite, all parts being by weight. The powdered metals used are finer than 325 mesh and of irregular or dendritic particle shape and they have an apparent density not exceeding about 20% of their true density in the finely divided state. Nickel, chrome and iron powders having these characteristics can be intimately mixed with graphite having an apparent density of 0.6 gram per cubic centimeter. The mixture of metals and graphite is cold pressed at about 21 tons per square inch to form a green compact. Thereafter, the green compact is heated to 1000° C. for two hours and then is subjected to a hot pressing operation at about 15 tons per square inch and held under that pressure until cooled to 200° C. This product is extremely hard and strong but, nevertheless, has the slick or lubricated surface feel that characterizes the bronze and iron compacts described above.

Nickel appears to serve the same purpose as the copper disclosed in Example 1, namely, it strengthens the product thereby enabling increased amounts of graphite to be included in the product.

Chrome nickel alloys can also be formed and provided with self-lubricating properties as shown in the following example:

EXAMPLE 5

Equal parts of chromium and nickel powders of the kind used in Example 4 are mixed together with 8% by weight of graphite. This mixture is treated in the same way as the iron, nickel and chrome mixture described in Example 4, and a hard corrosion-resistant bearing material capable of resisting operating temperatures on the order of 800° C. is produced thereby.

The process is also applicable to aluminum alloys which also find use in bearing materials and the like as shown in the following example:

EXAMPLE 6

A mixture of powdered metals and graphite of the following composition was formed:

| | Percent |
|---|---|
| Copper | 1 |
| Graphite | 10 |
| Silicon | 3 |
| Aluminum powder | 86 |

All of the powdered metals used are of a particle size less than 325 mesh. The aluminum powder should have an apparent density not exceeding 1.7 grams per cubic centimeter. This mixture is cold pressed at 21 tons per square inch to produce a compact which is heated at 570° C. for one hour in a furnace. The heated compact is then hot pressed at 14 tons per square inch and held under this pressure until the compact has cooled to 300° C. The product is a dense, shiny, aluminum-colored article having a greasy-feeling surface produced by the film of graphite thereon.

For high temperature use under conditions where resistance to corrosion is desirable, other "stainless" metals may be produced in accordance with the invention. Examples of high nickel, "Inconel" and "Monel" metals are given in the following table together with the conditions under which they are made.

Table II

| | High Nickel | Inconel | Monel |
|---|---|---|---|
| Material: | | | |
| Nickel percent | 86.0 | 72.0 | 63.0 |
| Copper do | 4.0 | | 27.0 |
| Iron do | | 5.4 | |
| Chromium do | | 12.6 | |
| Carbon do | 10.0 | 10.0 | 10.0 |
| Cold Compacting Pressure t.s.i. | 21.4 | 21.4 | 21.4 |
| Slug Heated To °C | 1,100 | 1,100 | 1,100 |
| Hot Compacting Pressure t.s.i. | 21.4 | 21.4 | 21.4 |

The slugs or molded articles were introduced into preheated molds having a temperature of about 700° C. after the articles had been heated at 1100° C. for about an hour.

Self-lubricating materials of the kind described have a multitude of uses in all fields where friction is a problem. The material has been used successfully for piston rings for diesel engines, for bearings of washing machines, where lubricants are not permitted, for the bearings of steam turbines, for sliding parts like slide valves, piston rings, segments of stuffing boxes and many other fields where they are subjected to high operating pressures and temperatures, thereby fulfilling a long-felt want in fields of use where ordinary lubrication may leave something to be desired in the over-all effects thereof.

It will be understood that the examples of self-lubricating materials given above are illustrative and that the composition of the materials and the proportions of the metal powders may be varied considerably depending upon the specific requirements or specifications of the metal desired. Moreover, other solid lubricants may be used instead of graphite in a particular molding mixture when present in equivalent proportion and particle size and having the same behavior under the processing to which the mixture is subjected. Therefore, the examples given herein should be considered as illustrative of the invention and not as limiting the scope of the following claims.

What is claimed is:

1. A process for the manufacture of graphite-containing metal powder moldings which comprise mixing about 4% to 17% by weight of graphite predominantly of a particle size less than about 1 micron intimately with a mixture of metal powders consisting essentially of a predominant proportion of metal powder selected from the class consisting of iron, nickel, copper and aluminum powders and having an apparent density not exceeding about 20% of the true density of the metal and containing about 5% to about 80% by weight of irregularly-shaped particles of a size less than 30 microns and a minor proportion of a metal powder other than the predominant metal powder and capable of bonding therewith, said other powder being selected from the class consisting of copper, nickel, iron, titanium, tin, zinc, cobalt, chromium, lead, beryllium, silicon and antimony, cold pressing the mixture in a mold to produce a self-sustaining molded article subjecting the article in a mold to a pressure greater than 1000 atmospheres absolute and less than a pressure sufficient to bond the article to the mold at an elevated temperature of about 930° to 1000° C. for mixtures in which iron powder predominates, 720° C. to 800° C. for mixtures in which copper powder predominates, as high as 1200° C. for mixtures in which nickel predominates and up to about 570° C. for mixtures in which aluminum predominates to forge weld the metal particles together at their contacting surfaces without melting them and then, the pressure being maintained, cooling the article.

2. Process for the manufacture of graphite-containing metal powder moldings comprising mixing about 4% to 17% by weight of graphite predominantly of a particle size less than about 1 micron with a mixture of metal powders composed predominantly of irregularly-shaped particles and having an apparent density not exceeding about 1.7 grams per cubic centimeter, said metal powders consisting essentially of a predominant proportion of a metal powder selected from the group consisting of iron, nickel, copper and aluminum and a minor portion of at least one different metal powder selected from the class consisting of iron, nickel, copper, tin, lead, zinc, silicon, antimony, cobalt, beryllium and chromium, cold pressing the mixture in a mold to produce a self-sustaining molded article, subjecting the article in a mold at an elevated temperature of about 930° C. to 1000° C. for mixtures in which iron powder predominates, 720° C. to 800° C. for mixtures in which copper powder predominates, as high as 1200° C. for mixtures in which nickel predominates and up to about 570° C. for mixtures in which aluminum predominates, to a pressure greater than 1000 atmospheres absolute and less than a pressure sufficient to bond the article to the mold to forge weld the metal particles together at their contacting surfaces and then, the pressure being maintained, cooling the article.

References Cited in the file of this patent

UNITED STATES PATENTS

| | | |
|---|---|---|
| 1,775,358 | Smith | Sept. 9, 1930 |
| 2,175,899 | Kelly | Oct. 10, 1939 |
| 2,191,460 | Fisher | Feb. 27, 1940 |
| 2,225,424 | Schwarzkopf | Dec. 17, 1940 |
| 2,229,330 | Langhammer et al. | Jan. 21, 1941 |
| 2,437,127 | Richardson | Mar. 2, 1948 |

FOREIGN PATENTS

| | | |
|---|---|---|
| 465,936 | Great Britain | Mar. 13, 1937 |

OTHER REFERENCES

Goetzel: "Treatise on Powder Metallurgy," vol. 1, pages 92–99, published 1949.

UNITED STATES PATENT OFFICE
CERTIFICATION OF CORRECTION

Patent No. 2,974,039                      March 7, 1961

Max Deventer et al.

It is hereby certified that error appears in the above numbered patent requiring correction and that the said Letters Patent should read as corrected below.

Column 7, line 75, the paragraph beginning with "The materials having" and ending with "and 14% tin." in column 8, line 6, should appear as shown below instead of as in the patent:

The materials having the physical characteristics set forth in columns II and III differ from the materials of Example 2 in that they contain 10% graphite and 12% graphite and 74% copper and 72% copper, respectively.

column 10, line 42, for "berryllium" read -- beryllium --.

Signed and sealed this 25th day of July 1961.

(SEAL)
Attest:

ERNEST W. SWIDER                  DAVID L. LADD
Attesting Officer                Commissioner of Patents